US007002007B2

(12) United States Patent
Berbaum

(10) Patent No.: US 7,002,007 B2
(45) Date of Patent: Feb. 21, 2006

(54) PRODUCTION OF HIGH MOLECULAR WEIGHT HYALURONATES

(75) Inventor: Michael Berbaum, Pottstown, PA (US)

(73) Assignee: Calcigen Corporation, Bethlehem, PA (US)

( * ) Notice: Subject to any disclaimer, the term of this patent is extended or adjusted under 35 U.S.C. 154(b) by 0 days.

(21) Appl. No.: 10/856,473

(22) Filed: May 28, 2004

(65) Prior Publication Data

US 2005/0267301 A1 Dec. 1, 2005

(51) Int. Cl.
*C08B 37/00* (2006.01)
(52) U.S. Cl. .................. 536/127; 536/124; 536/55.1; 514/54
(58) Field of Classification Search ............ 536/124, 536/55.1, 127; 514/54
See application file for complete search history.

(56) References Cited

U.S. PATENT DOCUMENTS

| | | | |
|---|---|---|---|
| 4,141,973 A * | 2/1979 | Balazs .................... | 514/54 |
| 4,517,295 A | 5/1985 | Bracke et al. | |
| 4,713,448 A | 12/1987 | Balazs et al. | |
| 4,780,414 A | 10/1988 | Nimrod et al. | |
| 4,782,046 A | 11/1988 | Brown et al. | |
| 4,784,990 A | 11/1988 | Nimrod et al. | |
| 4,946,780 A | 8/1990 | Hashimoto et al. | |
| 5,099,013 A | 3/1992 | Balazs et al. | |
| 5,411,874 A | 5/1995 | Ellwood et al. | |
| 5,631,241 A | 5/1997 | della Valle et al. | |
| 6,090,596 A | 7/2000 | Stahl | |
| 6,489,467 B1 | 12/2002 | Carlino et al. | |
| 6,537,795 B1 | 3/2003 | Stahl | |
| 6,660,853 B1 * | 12/2003 | Prescott ................... | 536/55.1 |
| 2003/0175902 A1 | 9/2003 | Sloma et al. | |

OTHER PUBLICATIONS

March et al., Advanced Organic Chemistry., 1992, Wiley & Sons, Inc. pp. 250-251. ☐☐☐☐Greant et al., Grant & Hack's Chemical Dictionary., 1987, Donnelley & Sons Company., pp. 11-12.*

Grant et al., Grant & Hack's Chemical Dictionary., 1987, Donnelley & Sons Company., pp. 11-12.*
Karlsson et al. Determination of the Distribution of Molecular Masses of Sodium Hyaluronate by High-Performance Anion Exchange Chromatography. 2003. Journal of Chromatography A. 986 pp. 67-72.*
Jacob et al., Large-Scale Purification of Proteins from Egg White by Tentacle Ion Exchangers. 1994. American Biotechnology Laboratory 12(13) p. 37.*
Heaney et al. The Isolation and Characterization of Hyaluronic Acid in Egg Shell. 1976. Biochimica et Biophysica Acta 451 pp. 133-142.*
Merck KGaA Darmstadt Germany Fractogel EMD brochure Sep. 1999.*
Chambers et al., 1998, Am. J. Resp. Cell Mol. Biol. 19: 498-506.
Grootveld et al., 1991, Biochem. J. 273: 459-467 (abstract only).
Grootveld et al., 1999, Free Radic. Res. 30: 351-369 (abstract only).
Jahn et al., 1999, Carbohydr. Res. 321: 228-234 (abstract only).
Jenkins et al., 2004, J. Biol. Chem. 279: 41453-41460.
Luke et al., 1999, Biochem J. 343: 71-75.
Mahoney et al., 2001, Glyobiol. 11: 1025-1033.
Theocharis et al., 1999, International J. Biol. Macromolecules 26: 83-88.
Uchiyama et al., 1990, J. Biol. Chem. 265: 7753-7759.

* cited by examiner

*Primary Examiner*—James O. Wilson
*Assistant Examiner*—Matthew L. Fedowitz
(74) *Attorney, Agent, or Firm*—Duane Morris LLP

(57) ABSTRACT

Methods of making high molecular weight hyaluronates are disclosed. The methods include contacting a hyaluronate-containing source with an acid to make an acidic hyaluronate suspension, contacting that suspension with an anionic ion exchange medium in the presence of an acidic buffer, and thereafter contacting the medium with an acidic buffer having a higher salt content to desorb the hyaluronate from the medium. The methods are amenable for isolating hyaluronate from such sources as avian (e.g., chicken, duck, turkey, or goose) eggshells and connective tissues of animals.

20 Claims, No Drawings

PRODUCTION OF HIGH MOLECULAR WEIGHT HYALURONATES

BACKGROUND OF THE INVENTION

The invention relates generally to the field of hyaluronic acid and hyaluronate salts.

Hyaluronic acid (HA) is a member of a class of polymers known as glycosaminoglycans. HA is a long chain linear polysaccharide and is available in the form of a sodium salt which has the molecular formula of $(C_{14}H_2ONNaO_{11})_n$ where n can vary according to the source, isolation procedure, and method of determination. Molecular weights of up to 14,000,000 have been reported.

HA and its salt derivative can be isolated from many sources including nearly all connective matrices of vertebrate organisms. Additionally, HA is also a capsular component of bacteria such as *Streptococci* (Kendall et al, 1937, Biochem. Biophys. Acta, 279, 401–405) and some *Bacilli* (U.S. Patent Application Publication No. 2003/0175902).

HA is non-immunogenic and therefore has a wide array of applications in medicine, particularly in purified and sterilized forms. HA having a high molecular weight (>about 1 million) has been found to be particularly useful owing, at least in part, to its viscoelastic properties. The HA which is at present commercially available is generally obtained from avian sources such as rooster combs. This material is difficult to process, and repeated and complex purification procedures are needed. A suitable process is described in U.S. Pat. No. 4,141,973, for example. HA is often expensive for these reasons.

Existing commercial technologies to produce HA rely on one of several methods. Connective tissues, such as the combs of roosters, human umbilical cords or other known HA sources can be processed to yield HA. Alternately, the material can be produced through a fermentation process in which it is removed from the capsule surrounding *Streptococci* or other bacteria. Most known methods rely on the use of solvents such as chloroform, ethanol and acetone.

A need exists for a commercially feasible way to make large quantities of HA and HA salts (i.e., hyaluronates) in an economical manner. The present invention satisfies this need.

BRIEF SUMMARY OF THE INVENTION

The invention relates to a method of isolating high molecular weight hyaluronate from a hyaluronate-containing source. The method comprises contacting the source with an acidic solution to yield an acidic hyaluronate suspension. That suspension is contacted with an anion exchange medium (e.g., a tentacle anion exchange medium) in the presence of an acidic, relatively low salt buffer. Thereafter, the medium is contacted with an acidic, relatively high salt buffer to obtain a second suspension which comprises the isolated high molecular weight hyaluronate.

The identity of the source is not critical. Examples of suitable sources include animal sources such as avian (e.g., chicken, duck, goose, or turkey) eggshells and bacterial sources. When the source comprises a solid mass, it can be beneficial to reduce the particle size of the source prior to contacting it with the acidic solution. This can be achieved in a variety of ways, including milling, crushing, cutting, and chopping.

The identity of the acidic solution is not critical, and can be a solution of a strong or, preferably, weak acid. Examples of suitable acids include acetic, formic, citric, phosphoric, and malic acids, as well as mixtures of these. The concentration of the acid should not be less than 1 molar if a weak acid is used, nor should it be more than 8 molar.

The acidic hyaluronate suspension can be clarified prior to contacting it with the medium. Alternatively, or in addition, the suspension can be filtered prior to contacting it with the medium (e.g., by retaining the suspension on one side of a semi-permeable membrane having a molecular weight cut-off not greater than about 1,000,000 or not greater than about 300,000).

In one embodiment, each of the acidic, relatively low salt buffer and the acidic, relatively high salt buffer comprises a common buffering agent (e.g., acetate buffer). In addition, or alternatively, each of the acidic, relatively low salt buffer and the acidic, relatively high salt buffer comprises a common salt (e.g., a salt of an alkaline ion and a halide or a salt of an alkaline earth ion and a halide, such as sodium chloride, potassium chloride, or calcium chloride) at different concentrations. The acidic, relatively low salt buffer and the acidic, relatively high salt buffer can also have about the same pH, about the same buffering agent concentration, or both.

DETAILED DESCRIPTION OF THE INVENTION

The invention relates to a method of isolating high molecular weight hyaluronate from a hyaluronate-containing source such as eggshells. The method comprises contacting the source with an acidic solution to yield an acidic hyaluronate suspension. This hyaluronate suspension can be clarified, ultrafiltered, concentrated, or otherwise treated prior to contacting it with an anion exchange medium in the presence of an acidic, relatively low salt buffer. Under those conditions, the hyaluronate is adsorbed with the medium and no longer flows freely with the buffer. By washing the medium with the buffer, impurities (i.e., compounds other than hyaluronate that were in the suspension but which did not adsorb with the medium) can be separated from the hyaluronate. By contacting the medium with an acidic, relatively high salt buffer, the hyaluronate desorbs from the medium and can be collected as a suspension. This suspension contains the isolated high molecular weight hyaluronate.

This method for production of hyaluronate can be used to produce it in large quantities, with high purities to reduce immunogenic response, and at a low cost. Eggshells of commercial hens are not efficiently utilized and are presently disposed as waste. Eggshells therefore are widely available both at a low cost and in a large amount, and the methods described herein can be used to isolate hyaluronates from them. The methods described herein are not limited to hyaluronate isolated from eggshells.

Another advantage of the hyaluronate isolation methods described herein is that those methods yield hyaluronates having relatively high purity, such that they reduce the likelihood of an immunogenic response when they are used in materials incorporated into the human (or other animal) body. Hyaluronates made by the methods described herein are characterized by relatively low levels of contaminant proteins and glycoaminoglycans derived from the hyaluronate source.

Definitions

As used herein, each of the following terms has the meaning associated with it in this section.

"High molecular weight" hyaluronate means HA or a salt of HA having a molecular weight not less than about one million.

A "tentacle" anion exchange medium is a medium characterized by interposition of a linear polymer chain between one or more anion exchange functional moieties and the bulk medium substrate. FRACTOGEL® EMD anion exchange media (Merck KGaA, Darmstadt Germany) are examples of tentacle anion exchange media.

A fluid is "clarified" by removing substantially all macroscopic solid or semi-solid materials from the fluid.

An "acidic" buffer is a solution comprising a buffering agent and having a pH not greater than 7.

A "weak" acid is an acid that does not substantially fully ionize in aqueous solution and that is characterized by an acid dissociation constant, typically denoted $K_A$. In contrast, a strong acid substantially fully ionizes in aqueous solution and cannot be characterized by a $K_A$ value, because substantially no non-ionized acid remains in solution. Examples of weak acids include oxalic, phosphoric, chloroacetic, citric, formic, benzoic, oxalic, succinic, acetic, and propionic acids.

DETAILED DESCRIPTION

The invention relates to a method of isolating high molecular weight hyaluronate from a hyaluronate-containing source. The method comprises contacting the source with an acidic solution to yield an acidic hyaluronate suspension. The suspension is contacted with an anion exchange medium in the presence of an acidic, relatively low salt buffer. Thereafter, the medium is contacted with an acidic, relatively high salt buffer to obtain a second suspension comprising the isolated high molecular weight hyaluronate.

The pKa of hyaluronate is approximately 2.8 to 2.9. In the prior art, others used anion exchange chromatography of hyaluronate-containing samples for analytical use purposes, but using a neutral-to-alkaline chromatography buffer system (e.g., Tsiganos et al., 1986, Biochem. J. 235(1):117–123, abstract). In contrast, the anion exchange techniques employed in the preparative-scale techniques described herein employ an acidic chromatography buffer system. It has also been discovered that tentacle anion exchange chromatography media are particularly well suited for the hyaluronate isolation methods described herein.

Hyaluronate-Containing Sources

The methods described herein are useful for isolating high molecular weight hyaluronate from substantially any source in which it can be found. In particular, isolation from vertebrate animal and bacterial sources is envisioned, although it is likely that the methods can be used to isolate hyaluronate from any other source in which it may be found to occur naturally or from synthetic sources. Preferably, the high molecular weight hyaluronate-containing source is an animal source, such as a connective tissue (membrane, ligament, tendon, or extracellular matrix) of a vertebrate. For economic reasons, avian (e.g., commercial chicken, duck, goose, and turkey) eggshells are preferred.

Avian sources are also preferred in some instances because they are non-mammalian sources. Connective tissues of mammals (e.g., cows and pigs) contain significant quantities of hyaluronates, but can also harbor disease vectors (e.g., the mad cow disease vector) that can, at least potentially, cross species and adversely affect humans or other animals into whose bodies isolated hyaluronates may be implanted or place. Bacterial sources of hyaluronate are also suitable as starting materials for the hyaluronate isolation methods described herein.

Depending on the characteristics of the hyaluronate source, the source or a hyaluronate-containing portion of the source can be preserved, frozen, dried, or otherwise accumulated prior to isolating hyaluronate therefrom using the methods described herein.

Acidic Hyaluronate Suspension

The hyaluronate source is contacted with an acidic solution to suspend hyaluronate in the solution, yielding an acidic hyaluronate suspension. In order to facilitate suspension of the hyaluronate in the solution, the particle size of the source can be reduced prior to contacting the source with the acidic solution. Alternatively, the source can be perforated, stretched, rolled, expanded, roughed, or otherwise treated in a manner designed to enhance contact between the source and the solution. A variety of particle reduction methods (e.g., milling, crushing, cutting, and chopping) and other contact-enhancing methods are suitable for preparing the source, and the selection of one or more appropriate methods is within the ken of the skilled artisan. By way of example, when avian eggshells are used as a source material, they eggshells can be milled to reduce empty, substantially halved shells to small bits having sizes in the range from about 0.1 to 0.05 square millimeters, thereby increasing the surface area of the shells and enhancing contact between the acidic solution and the eggshell bits.

The source is combined with an acidic solution in order to isolate hyaluronate therefrom. The acidic solution can be a solution of a weak acid such as acetic acid. If the hyaluronate source contains calcium salts (e.g., those in bone fragments or eggshells), the acidic solution also serves to dissolve the calcium components and thereby liberate any hyaluronates that may be caught up in the mineral matrix. The acid is preferably relatively concentrated, e.g., having a concentration in the range from 1 molar to 9 molar (preferably 3 to 7 molar) in order to overcome any acid-neutralizing capacity of the source or its components and to dissolve mineralized components of the source. Strong acids can also be used, so long as the hydronium ion concentration is controlled sufficiently to avoid significant degradation of hyaluronates in the source. Suitable acids include organic acids and non-organic acids, such as acetic, formic, phosphoric, citric, and malic acids. Combinations of acids can also be used. Strong acids should be avoided, because they can cause degradation (e.g., evidenced by decrease in number average molecular weight) of hyaluronate isolated from the source.

By way of example, avian eggshells can be mixed with a 40% (w/v) solution of glacial acetic acid in water such that the weight ratio of eggshells to solution is about 1:4 (eggshells:solution). At such a 1:4 ratio, the concentration of acetic acid should be not less than 30% (w/v). In the acidic mixture, mineral components (e.g., calcium carbonate) of the eggshells are dissolved and can be easily separated from hyaluronates (e.g., by dialysis, ultrafiltration, precipitation, or otherwise). A greater amount of acid solution can be added, relative to the amount of eggshells. However, as the volume of solution increases, the concentration of hyaluronates in the resulting mixture decreases. For that reason, it is preferable to minimize the volume of the acidic mixture.

The acidic solution should combined with the source and agitated to facilitate hyaluronate suspension. An appropriate type and degree of agitation can be determined by a skilled artisan, depending on the identity and nature of the source and the amount of the acidic solution used. By way of example, eggshell particles can be suspended in a volume (in liters) of acetic acid equal to their weight (in kilograms; i.e., 1 liter of acid to suspend 1 kilogram of eggshell particles) and stirred with an impeller at low rotational speed (e.g., a few rotations per minute) to facilitate liquefaction of the shell.

The source can be contacted with multiple aliquots of acid in order to maximize hyaluronate extraction. The multiple aliquots can be combined or processed separately. By way of example, when extracting hyaluronate from eggshells, the shell particles can be combined with a first aliquot of acidic solution, decanted (storing the liquid portion of the extract after the pH of the solution has reached to pKa of the acid being used), and the remaining solid portion can be contacted with a second aliquot of the acidic solution, and so on. An aliquoted contacting process has an advantage in that less tank volume is required to contact a given mass of source with a selected (total) volume of acid.

The acidic hyaluronate suspension obtained by contacting the source and the acidic solution can be used directly in the next (anionic chromatography) step of the process. However, the acidic hyaluronate suspension is preferably clarified, filtered, buffer-exchanged or otherwise rendered more suitable for anion exchange chromatography prior to further use.

The suspension can be clarified by centrifugation (e.g., at a g force range of 2500 to 10000×gravity) using a batch-wise or continuous process. For example, an acidic hyaluronate suspension obtained from eggshells can be centrifuged in a continuous flow centrifuge at a flow rate of 0.5 to 10 liters per minute, with a preferred range of 1 to 8 liters per minute.

Filtration can also be used to clarify the acidic hyaluronate suspension. For example, following, or instead of, centrifugation, the suspension can be filtered using a filter medium having a pore size in the range from about 0.2 to 10 microns.

The buffer of the acidic hyaluronate suspension can be exchanged for a different buffer (i.e., one suitable for use in the selected anion exchange chromatography medium) using any of a variety of known techniques, such as dialysis, ultrafiltration, dilution, and the like. For example, the buffer can be exchanged by ultrafiltering the suspension using an ultrafiltration medium having a selected molecular weight cut off (MWCO). The MWCO is preferably not greater than about 1,000,000, in order to retain high molecular weight hyaluronates. Ultrafiltration media can have lower (e.g., 50,000, 100,000, or 300,000) MWCO values as well. In general, larger MWCO values tend to yielder faster ultrafiltration.

Anion Exchange Chromatography

The acidic hyaluronate suspension is applied directly, or after clarification, filtration, buffer exchange, or some combination of these, to an anion exchange medium equilibrated with an acidic, relatively low salt buffer. The identity of the buffer is not critical, except that it should not interfere with binding between hyaluronate obtained from the source and the anion exchange medium. Substantially all common acidic buffers should be suitable for these purposes, and the skilled artisan can readily determine whether any particular buffer is suitable.

The identity of the salt in the buffer is not critical. Substantially an salt having an anion capable of interacting with the anion exchange medium can be used. Preferably, a common alkaline halide (e.g., sodium chloride or potassium chloride) or alkaline earth halide salt (e.g., calcium chloride) salt is used. The concentration of the salt in the equilibration buffer is not critical. The concentration of the salt (assessed separately from the concentration of the buffering agent, regardless of whether the two have a common counter ion) in the equilibration buffer is not critical, except that the concentration of the salt must be low enough to permit binding of hyaluronate from the source with the anion exchange medium. When the salt is an alkaline halide or an alkaline earth halide, the concentration of the salt in the equilibration buffer will generally be less than 0.35 molar, and is preferably not greater than about 0.2 molar. The concentration of salt in the acidic, relatively low salt buffer can be zero (i.e., salt-free).

The acidic hyaluronate suspension is contacted with the anion exchange medium in the presence of the acidic, relatively low salt buffer. Hyaluronate in the suspension binds with the anion exchange medium, permitting non-hyaluronate impurities to be rinsed from the medium. The suspension can be, and preferably is, equilibrated or exchanged with the anion exchange medium equilibration buffer prior to contacting it with the medium. An acidic, relatively high salt buffer can then be contacted with the medium to desorb the hyaluronate therefore, permitting its elution or collection.

Preferably, the buffering agent in the high and low salt buffers are the same, as is the pH of the two buffers. The pH of the buffer is less than 7, and is preferably not less than about 2.5. The salts in the two buffers can be the same (albeit at different concentrations), or different salts can be used.

The concentration of the buffering agent in each of the two buffers is not critical, but should be sufficient to maintain the buffer at an acidic pH under the conditions used. Suitable buffering agent concentrations include those in the range from about from 10 millimolar to 1 molar, but others are not excluded.

The identity of the anion exchange medium is not critical, although tentacle anion exchange media are preferred. The suitability of any particular anion exchange medium for the methods described herein can be assessed by the skilled artisan using no more than ordinary chromatographic techniques. Preferred media include tentacle anion exchange media sold by Merck KGaA under the trade names FRACTOGEL® EMD TMAE, FRACTOGEL® TMAE HiCap, FRACTOGEL® DEAE, FRACTOGEL® DEAE HiCap, FRACTOGEL® DMAE, and FRACTOGEL® DMAE HiCap. In these media, a long carbon spacer chain places the functional group of this ion exchanger further from the chromatography matrix then traditional matrices. This type of matrix is highly efficient at capturing and purifying large macromolecules.

The bound hyaluronate present in the chromatography column is eluted (desorbed and rinsed) from the anion exchange medium by contacting the medium with the acidic, relatively high salt buffer. In a preferred arrangement, the anion exchange medium is contained in a standard chromatographic column, contacted with the hyaluronate suspension to adsorb hyaluronate to the medium, and then rinsed with the acidic, relatively high salt buffer in order to elute the hyaluronate from the medium in the column. In this arrangement, the column can be rinsed with multiple volumes of the equilibration buffer to remove impurities prior to rinsing it with the acidic, relatively high salt buffer to elute the hyaluronate. During rinsing with the acidic, relatively high salt buffer, at least several (preferably 5 to 12) column volumes (i.e., bed height multiplied by the cross-sectional area of the column) can be used to rinse the hyaluronate from the medium.

Post Chromatography Processing

The hyaluronate-containing suspension eluted from the anion exchange medium can be used in that form, or it can be further processed. By way of example, it can be ultrafiltered or dialyzed using a membrane having a selected MWCO (e.g., 50,000, 100,000, 300,000, or 1,000,000). The concentration of hyaluronate in the solution can be determined with any of a variety of known assays, such as a glucuronic acid-based assay or an enzyme-linked hyaluronic acid binding protein assay. The counter ion (e.g., hydrogen, sodium, potassium, or calcium) of the hyaluronate product can be selected using known buffer exchange techniques. The hyaluronate suspension can be dialyzed, filtered, concentrate, buffer-exchanged, frozen, lyophilized, or otherwise treated using known methods, depending on the desired form of the final hyaluronate product.

By way of example, the acidic, relatively high salt buffer can be exchanged for a neutral or alkaline sodium-containing buffer in order to form a sodium hyaluronate suspension. The suspension can be filter sterilized using a 0.2 micron filter and transferred into appropriate freeze drying vessels. The sodium hyaluronate can be frozen at −20 to −80° C. for 4 hours or more before commencing lyophilization. Lyophilization can be carried out at 25 to 200 millitorr for 12 to 36 hours, preferably 50 to 100 millitorr for 18 to 24 hours to convert the sodium hyaluronate into a powder.

EXAMPLES

The invention is now described with reference to the following Examples. These Examples are provided for the purpose of illustration only, and the invention is not limited to these Examples, but rather encompasses all variations which are evident as a result of the teaching provided herein.

Example 1

Production of Sodium Hyaluronate from Chicken Eggshell

As an example of the process outlined herein, 4.5 kilograms of milled chicken eggshell was mixed with 4.5 liters of 5.8 molar acetic acid in a 10 liter vessel. The slurry was mixed at a slow rate (to avoid vortex formation) until the pH of the suspension reached pH 4.0– 4.6. The liquid fraction of the suspension was then decanted, and the solid fraction mixed with an additional 4.5 liters of 5.8 molar acetic acid. The stepwise extraction series was repeated for a total of eight volumes of acid per kilogram of eggshell (i.e., 36 liters of acid), after which the calcium portion of the shell had been solublized. As each step in the extraction series was executed, the liquid fraction from the preceding step was centrifuged through a continuous flow centrifuge at a feed rate of about 1 liter per minute. The centrifuged HA extract was then passed through a 5 micron filter to remove any suspended aggregates (i.e., clarify) prior to ultrafiltration. The final volume of the clarified HA extracts was about 8×4.5 liters, or 36 liters.

Individual 4.5 liter clarified HA extracts were concentrated using a 0.5 square meter 300,000 molecular weight cut-off (MWCO) polyethersulfone (PES) ultrafiltration membrane. At the scale used in this example, the crossflow was 5.0 liters per minute, the filtrate flow rate was 50 milliliters per minute, and the filtrate flux was 6 liters per square meter per hour ($l/(m^2h)$). Suitable conditions include a crossflow rate of 2.0–5.0 liters per minute and a flux of 3–30 $l/(m^2h)$. The concentration was continued until a 3- to 5-fold concentration was achieved. Additional clarified HA extracts were individually added into the ultrafiltration retentate to process the extract series, as soon as practical as each fraction was available for ultrafiltration. In this manner, the entire extract series was concentrated 3- to 5-fold relative to the original volume and diafiltration against dilute acidic buffer could commence. The HA extract concentrate was diafiltered against 0.05 molar acetate, 0.2 molar potassium chloride at pH 4.6 by exchanging four volumes of diafiltrate buffer. This was achieved by several times adding the diafiltrate buffer to the retentate vessel and ultrafiltering the mixture. In this example, 15 hours was necessary to complete the concentration step. However, the extracts could have alternatively been pooled, concentrated, and then diafiltered all at once.

The diafiltered HA extract was processed using a 100 ml FRACTOGEL® HiCap EMD TMAE tentacle anion exchange chromatography column (Merck, KGaA, Darmstadt, Germany) at a linear flow rate of 300 centimeters per hour. This example used a 18.5 centimeter (length)×2.6 centimeter diameter column at a flow rate of 26.5 milliliters per minute. The column was equilibrated with 0.05 molar acetate, 0.2 molar potassium chloride at pH 4.6 prior to loading HA extract. After loading the HA extract, the column was flushed with 5 column volumes (circa 500 milliliters) of this equilibration buffer.

HA bound to the column medium was eluted by washing the column with 1.0 liter of 0.05 molar acetate, 0.4 molar potassium chloride at pH 4.6 at about the same flow rate. This volume of washing buffer represents about 10 column volumes. The column was then regenerated by passing through it an excess of 1.0 molar potassium chloride in 0.05 molar acetate pH 4.6.

The HA elution was next diafiltered using a 0.5 square meter 300,000 MWCO PES ultrafiltration membrane. The eluted material was diafiltered by pumping the retentate at a cross flow rate of 500 milliliters per minute and a filtrate flux of 3.6 $l/(m^2h)$. In this example, the filtrate flow rate was about 30 milliliters per minute. The diafiltrate buffer was introduced into the retentate vessel at a rate equal to the permeate flow rate, and a total volume of this buffer equal to about 6 times the initial volume of the eluted HA fraction (i.e., about 6 liters) was supplied. The diafiltered sodium HA solution was then concentrated about 5-fold by halting addition of the diafiltration buffer exchange and allowing the retentate to be reduced to a volume of 200 milliliters.

The diafiltered sodium HA solution was sterilized by passing it through a 0.2 micron filter into a lyophilization vessel, and it was frozen at −40° C. for 12 hours prior to initiation of lyophilization.

The lyophilizer was started and equilibrated to 100 millitorr and −150° C. before adding the frozen sodium HA sample. Once connected, the vacuum was applied and the sodium HA was freeze dried for 18 hours to completely dry the sample to a powdered form.

The disclosure of every patent, patent application, and publication cited herein is hereby incorporated herein by reference in its entirety.

While this invention has been disclosed with reference to specific embodiments, it is apparent that other embodiments and variations of this invention can be devised by others skilled in the art without departing from the true spirit and scope of the invention. The appended claims include all such embodiments and equivalent variations.

What is claimed is:

1. A method of isolating high molecular weight hyaluronate from a hyaluronate-containing source, the method comprising contacting the source with an acidic solution to yield an acidic hyaluronate suspension, contacting the suspension with an anion exchange medium in the presence of an acidic, relatively low salt buffer, and thereafter contacting the medium with an acidic, relatively high salt buffer to obtain a second suspension comprising the isolated high molecular weight hyaluronate.

2. The method of claim 1, wherein the particle size of the source is reduced prior to contacting the source with the acidic solution.

3. The method of claim 2, wherein the particle size of the source is reduced by a method selected from the group consisting of milling, crushing, cutting, chopping, and combinations of these.

4. The method of claim 1, wherein the source is an avian source.

5. The method of claim 1, wherein the source is an avian eggshell.

6. The method of claim 1, wherein the acidic solution is comprises an organic acid.

7. The method of claim 6, wherein the acidic solution is selected from the group consisting of acetic acid, formic acid, citric acid, phosphoric acid, malic acid, and mixtures of these, and the concentration of the acid is not less than 1 molar.

8. The method of claim 6, wherein the organic acid is acetic acid.

9. The method of claim 6, wherein the concentration of the acid in the acidic solution is not less than 1 molar.

10. The method of claim 1, wherein the acidic hyaluronate suspension is clarified prior to contacting the suspension with the medium.

11. The method of claim 1, wherein each of the acidic, relatively low salt buffer and the acidic, relatively high salt buffer comprises a common buffering agent.

12. The method of claim 11, wherein the buffering agent is acetate buffer.

13. The method of claim 11, wherein each of the acidic, relatively low salt buffer and the acidic, relatively high salt buffer comprises a common salt at different concentrations.

14. The method of claim 13, wherein the common salt is either a salt of an alkaline ion and a halide or a salt of an alkaline earth ion and a halide.

15. The method of claim 13, wherein the common salt is selected from the group consisting of sodium chloride, potassium chloride, calcium chloride, and mixtures of these.

16. The method of claim 11, wherein each of the acidic, relatively low salt buffer and the acidic, relatively high salt buffer have about the same pH.

17. The method of claim 16, wherein the pH is not less than about 2.5.

18. The method of claim 11, wherein each of the acidic, relatively low salt buffer and the acidic, relatively high salt buffer have about the same buffering agent concentration.

19. The method of claim 1, wherein the medium is a tentacle anion exchange medium.

20. The method of claim 1, wherein the acidic hyaluronate suspension is filtered prior to contacting the suspension with the medium, and wherein the filtration comprises retaining the suspension on one side of a semi-permeable membrane having a molecular weight cut-off not greater than about 1,000,000.

* * * * *